United States Patent
Ganu et al.

(10) Patent No.: US 10,951,461 B2
(45) Date of Patent: Mar. 16, 2021

(54) ANOMALY-DRIVEN PACKET CAPTURE AND SPECTRUM CAPTURE IN AN ACCESS POINT

(71) Applicant: HEWLETT PACKARD ENTERPRISE DEVELOPMENT LP, Houston, TX (US)

(72) Inventors: Sachin Ganu, Santa Clara, CA (US); Ahmad Kholaif, Santa Clara, CA (US); Karthik Srinivasa Murthy, Santa Clara, CA (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 0 days.

(21) Appl. No.: 16/264,480

(22) Filed: Jan. 31, 2019

(65) Prior Publication Data
US 2020/0252265 A1   Aug. 6, 2020

(51) Int. Cl.
*H04L 12/24* (2006.01)
*H04L 12/26* (2006.01)
*H04W 24/08* (2009.01)
*H04W 24/04* (2009.01)

(52) U.S. Cl.
CPC ........ *H04L 41/0631* (2013.01); *H04L 41/069* (2013.01); *H04L 43/0811* (2013.01); *H04W 24/04* (2013.01); *H04W 24/08* (2013.01)

(58) Field of Classification Search
None
See application file for complete search history.

(56) References Cited

U.S. PATENT DOCUMENTS

| | | | |
|---|---|---|---|
| 8,375,255 B2 | 2/2013 | Wang et al. | |
| 9,720,760 B2 | 8/2017 | Paulraj et al. | |
| 9,832,082 B2 | 11/2017 | Dade et al. | |
| 9,961,571 B2 | 5/2018 | Yang et al. | |
| 2013/0094371 A1* | 4/2013 | Vallath | H04W 76/18 370/252 |
| 2014/0289573 A1* | 9/2014 | Bennah | G06F 11/0769 714/48 |
| 2016/0219065 A1* | 7/2016 | Dasgupta | H04L 63/1425 |

(Continued)

OTHER PUBLICATIONS

Robert Ferruolo, "Auto Packet Capture, Where Have You Been All My Life?," available online at <https://web.archive.org/web/20170911023504/https://blog.mojonetworks.com/auto-packet-capture-where-have-you-been>, Sep. 11, 2017, 1 page.

(Continued)

*Primary Examiner* — Saumit Shah
(74) *Attorney, Agent, or Firm* — Nolte Lackenbach Siegel

(57) ABSTRACT

An access point providing a client device with access to a communication network detects an anomaly in packet traffic being transmitted to or received from the client device. In response, the access point performs a packet capture by triggering the release of stored packets. The access point determines an anomaly type representing a root cause of the anomaly and annotates the packet capture with the anomaly type. The access point also detects radio frequency interference exceeding a prescribed threshold and, in response, performs a spectrum capture. The packet capture, annotated with the anomaly type, and the spectrum capture are reported either automatically or in response to a request.

19 Claims, 5 Drawing Sheets

(56) References Cited

U.S. PATENT DOCUMENTS

| | | |
|---|---|---|
| 2017/0339022 A1 | 11/2017 | Hegde et al. |
| 2017/0366983 A1 | 12/2017 | Gunasekara et al. |
| 2018/0139086 A1 | 5/2018 | Chakraborty et al. |
| 2018/0220314 A1 | 8/2018 | Chen et al. |
| 2019/0123988 A1* | 4/2019 | Leverich ............. H04L 43/0823 |
| 2019/0138938 A1* | 5/2019 | Vasseur .................. G06N 5/003 |

OTHER PUBLICATIONS

Mist, "WiFi of Everything Presents: Dynamic Packet Capture for Simpler Wi-Fi Troubleshooting", available online at <https://www.mist.com/resources/wifi-everything-presentsdynamic-packet-capture-simpler-wi-fi-troubleshooting/>, retrieved in 2019, 2 pages.

Paredes-Oliva, I. et al., Automating Root-cause Analysis of Network Anomalies Using Frequent Itemset Mining, (Research Paper), Proceedings of the ACM SIGCOMM 2010, Citation 1—Last Line. Document was properly considered. Paredes-Oliva, I. et al. , Proceedings of the ACM SIGCOMM 2010 conference, Oct. 2010, pp. 467-468. vol. 40, No. 4.

Sheth, A. et al., Mojo: a Distributed Physical Layer Anomaly Detection System for 802.11 WLANs, (Research Paper), Proceedings of the 4th international conference on Mobile systems, applications and services, Jun. 19-22, 2006, pp. 191-204.

* cited by examiner

ANOMALY-DRIVEN PACKET CAPTURE AND SPECTRUM CAPTURE IN AN ACCESS POINT

BACKGROUND

An access point provides client devices with access to a communication network for transmitting and receiving packets to and from other devices. Problems in connectivity between the client devices and the access point, referred to as "anomalies", sometimes occur. To mitigate interruptions in access to the communication network, actions are taken to address these anomalies.

BRIEF DESCRIPTION OF THE DRAWINGS

The present disclosure is best understood from the following detailed description when read with the accompanying Figures. It is emphasized that, in accordance with the standard practice in the industry, various features are not drawn to scale. In fact, the dimensions of the various features may be arbitrarily increased or reduced for clarity of discussion.

DETAILED DESCRIPTION

Figure 1:
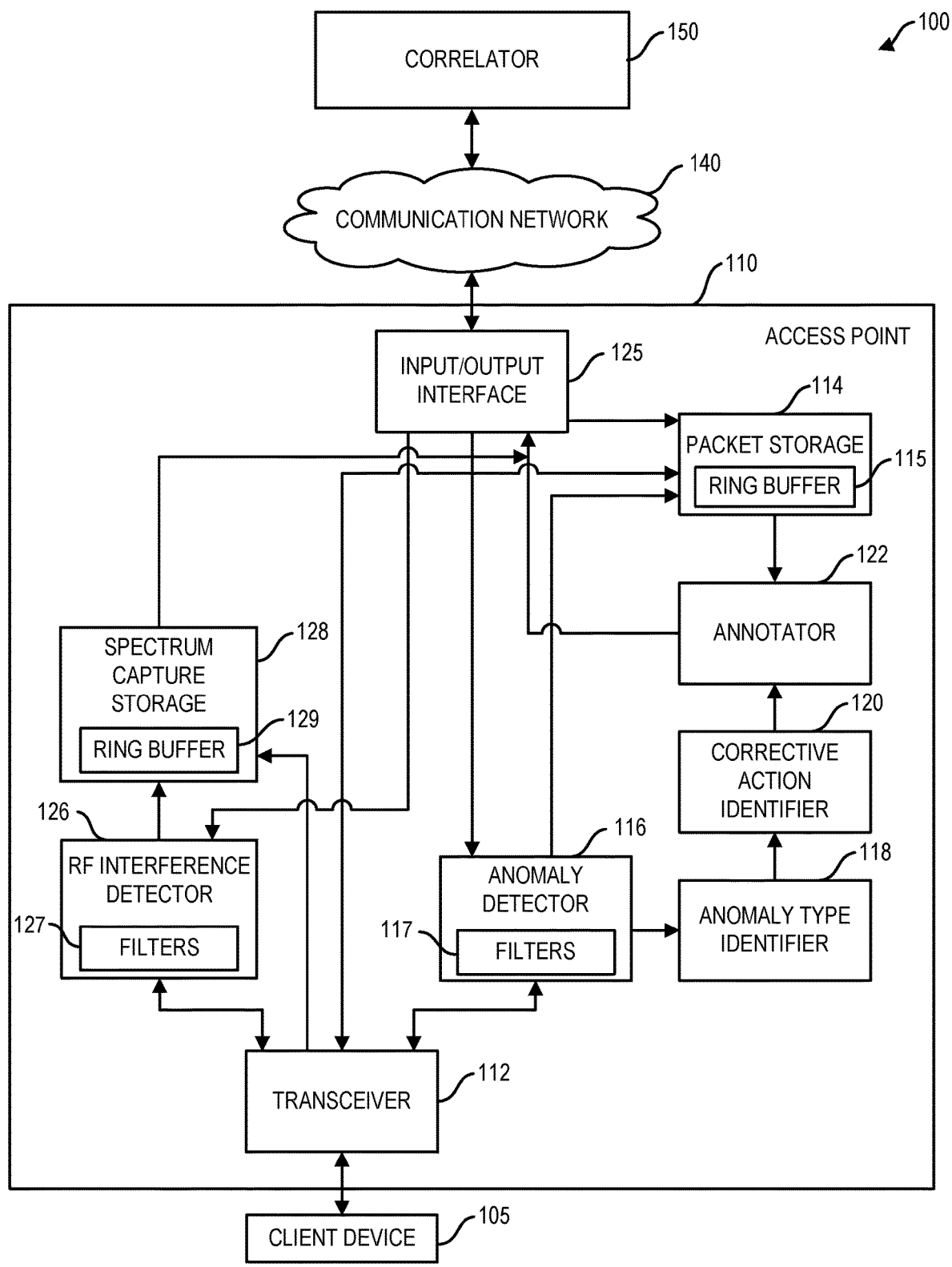
FIG. 1 conceptually illustrates a system including an access point for detecting an anomaly, according to one or more examples of the disclosure.

Illustrative examples of the subject matter claimed below will now be disclosed. In the interest of clarity, not all features of an actual implementation are described in this specification. It will be appreciated that in the development of any such actual implementation, numerous implementation-specific decisions may be made to achieve the developers' specific goals, such as compliance with system-related and business-related constraints, which will vary from one implementation to another. Moreover, it will be appreciated that such a development effort, even if complex and time-consuming, would be a routine undertaking for those of ordinary skill in the art having the benefit of this disclosure.

A communication network (such as the Internet, etc.) allows a client device to transmit and receive packets to and from other client devices, servers, etc. A client device refers to any form of programmable communication device including, but not limited to, smartphones, desktop computers, laptop computers, wearable devices, Internet of Things (IoT) devices, etc. A server refers to a computing device including a processor that performs operations to provide an application or a service. Access to the communication network is provided to the client device via an access point. An access point refers to a device that allows packets to be relayed between the communication network and the client devices via a wireless connection to the client devices and a wired connection to the communication network.

From time to time, anomalies occur in connectivity between the client devices and the access point. Analyzing and finding root causes for anomalies that occur in connectivity related to the transmission or reception of packets can be challenging due to sporadic occurrences and lack of timely information capture. Typically, this process relies on recreating the anomaly and collecting packet traces manually. Experts, then, interpret the raw packet captures to identify the root cause of an anomaly and initiate corrective actions. This approach is tedious, reactive, and incurs a delay in a timely response to mitigate the anomaly. Moreover, client devices are vulnerable to several low-level issues in interoperability between the client devices and the access point that can only be detected and identified by the access point.

In accordance with illustrative examples of the present disclosure, anomalies in connectivity between a client device and an access point are proactively detected by an access point as the anomalies occur. Anomalies in packet traffic and anomalies in connectivity due to radio frequency interference are both detected by the access point.

According to illustrative examples of the present disclosure, an access point providing a client device with access to a communication network detects an anomaly in packet traffic. In response to detecting the anomaly, the access point performs a packet capture of packets being transmitted to or received from the client device. The access point determines an anomaly type representing a root cause of the anomaly and annotates the packet capture with the anomaly type. The access point also detects radio frequency interference exceeding a prescribed threshold and, in response, performs a spectrum capture. The packet capture annotated with the anomaly type and/or the spectrum capture are reported automatically or upon request.

An example of a system 100 including an access point 110 for detecting an anomaly in connectivity with a client device 105 is shown in FIG. 1. As shown in FIG. 1, the access point 110 provides a client device 105 with access to a communication network 140. The access point 110 detects anomalies in connectivity with the client device 105. The access point 110 reports information representing these anomalies to a correlator 150 via the communication network 140. The anomalies may include anomalies in packet traffic and/or anomalies in connectivity due to radio frequency interference. The correlator 150 may include a server that correlates information representing anomalies from various access points. Although one client device 105 is shown in FIG. 1, it should be appreciated that anomalies in connectivity between any number of client devices and the access point 110 may be detected as described herein.

As shown in FIG. 1, the access point 110 includes a transceiver 112 for transmitting packets to and receiving packets from the client device 105 over a wireless radio connection, such as one in compliance with various wireless networking standards (e.g., Wi-Fi, IEEE 802.11, Bluetooth, Zigbee, etc.) The access point also includes a wired input/output (I/O) interface 125 for receiving packets from and transmitting packets to the communication network 140 over a wired connection, such as the Ethernet. The communication network 140 may include a packet network, such as the Internet.

The access point 110 includes a packet storage 114 for storing packets being transmitted to or received from the client device 105. The packet storage 114 may include a ring buffer 115. The ring buffer 115 may be limited in storage size and/or the number of entries that may be stored. According to one example, the ring buffer 115 normally operates in idle mode, during which there are wrapped overwrites with old packets being stored in the buffers until they are overwritten new packets. In the idle mode, packets are deleted in a first-in-first-out order when the ring buffer 115 is full to create storage space for a new packet to be added.

The access point 110 includes an anomaly detector 116 to detect an anomaly in packet traffic. One example of an anomaly in packet traffic may include an excessive number of transmit failures from the access point 110 to the client device 105. Another example of an anomaly in packet traffic may be repeated Block Acknowledgement (Ack) requests indicative of failure in aggregation state related information. The anomaly detector 116 includes filters 117 that indicate what anomalies the anomaly detector 116 is to detect. The filters 117 may be preconfigured and/or modified by the correlator 150 as described in more detail below.

As noted above, the ring buffer 115 stores packets as they are being received by and transmitted from the access point 110. In response to detecting an anomaly by the anomaly detector 116, the anomaly detector 116 initiates a "packet capture" by triggering the release of the packets currently stored in the ring buffer 115. That is, the anomaly detector causes the packets currently stored in the ring buffer 115 to be released as the packet capture.

The access point 110 also includes an anomaly type identifier 118 that determines a type of the detected anomaly representing a root cause of the anomaly. For this purpose, the anomaly type identifier 118 may include a list of anomaly types and associated root causes that match detected anomalies. For example, a detected excessive number of transmit failures may indicate that the client device 105 has disconnected from the access point 110 without the proper handshake. For this anomaly, the anomaly type would be "client device disconnected without improper handshake". As another example, detected repeated Block Ack requests may indicate that the 802.11 Media Access Control (MAC) aggregation window has gone out of sync between the access point 110 and the client device 105. For this anomaly, the anomaly type would be "MAC aggregation window out of sync".

Based on the type of the anomaly, an optional corrective action identifier 120 may identify a corrective action to take. An example of a corrective action may be to instruct the client device 105 to restart and attempt to reconnect. The access point 110 may initiate the corrective action and/or an identity of the corrective action may be provided to an annotator 122.

Additionally, depending on the type of the anomaly, a debugging log may be collected. A determination whether or not to collect a debugging log may be made by the anomaly type identifier 118. For example, the anomaly type identifier 118 may determine that a debugging log is to be collected for anomaly type A but not for anomaly type B. The debugging log may be collected by, for example, the annotator 122.

The annotator 122 annotates the packet capture with the anomaly type identifier and the corrective action identifier (if any) and provides them to the wired input/output interface 125. The annotator 122 may also attach a debugging log (if any) to the packet capture. The wired input/output interface 125 reports the packet capture to the correlator 150, either automatically or upon request by the correlator 150.

The access point 110 also includes a radio frequency (RF) interference detector 126 that detects radio frequency interference in the wireless connection over which packets are being transmitted to or received from the client device 105 and determines whether the radio frequency interference exceeds a prescribed threshold. Such radio frequency interference may be caused by devices emanating energy within the same spectrum as the wireless communication channel of the access point. Such devices may include, for example, microwaves, video transmitters, etc. The radio frequency interference may be detected as a communication channel noise floor that exceeds a prescribed threshold. Radio frequency interference may also be caused by excessive channel utilization outside the communication channel of the access point which may occur, for example, at certain times of the day. Thus, the radio interference may also be detected as channel utilization outside the communication channel of the access point that exceeds a prescribed threshold. An example of a prescribed threshold may be −80 dBm or −75 dBm. The prescribed threshold may be stored in filters 127 and may be preconfigured and/or modified by the correlator 150, as described in more detail below.

In response to detecting radio frequency interference over the prescribed threshold, the RF interference detector 126 initiates a spectrum capture. The spectrum capture is a "snapshot" showing the power spectral density of an interfering signal. The spectrum capture may include, for example, a Fast Fourier Transform "snapshot" of an interfering signal. According to one example, spectrum snapshots may be continually stored in a ring buffer 129 in a spectrum capture storage 128, and the RF interference detector 126 may initiate a "spectrum capture" by triggering the release of currently stored spectrum snapshots from the ring buffer 129. In this example, the spectrum capture includes the spectrum snapshots currently stored in the ring buffer 129. According to another example, to avoid overflow of the ring buffer 129, spectrum snapshots may be captured and stored in the ring buffer 129 only in response to the RF interference detector 126 initiating a spectrum capture. The spectrum capture may be reported via the input/output interface 125 to the correlator 150 either automatically or upon request.

The anomaly detector 116 and the RF interference detector 126 may operate in conjunction, respectively detecting anomalies in packet traffic and radio frequency interference exceeding a prescribed threshold at the same time. If no packets are being received or transmitted, the RF interference detector 126 may still operate to detect radio frequency interference.

Packet captures and/or spectrum captures are reported to the correlator 150 via the wired input/output interface 130 and the communication network 140. Depending, for example, on the amount of buffer storage in the access point 110, the packet captures and/or spectrum captures may be streamed continuously or sent as a file.

The correlator 150 also receives packet captures and spectrum captures from other access points (not shown). The correlator 150 correlates the annotated packet captures from the access point 110 with annotated packet captures from other access points. The correlator 150 also correlates the spectrum captures from the access point 110 with spectrum captures from other access points. Based on the correlations, the correlator 150 determines a corrective action to mitigate anomalies in connectivity in all the access points.

As an example, assume that two access points in geographically remote university environments are reporting anomalies in connectivity of smartphones having the most current operating system versions. Based on the annotated packet captures from the two access points, the correlator 150 may be able to determine that the anomalies are due to lack of interoperability of the smartphones with the access points and take measures to cure the issues with connectivity, e.g., updating the access points such that they can effectively communicate with the smartphones.

As noted above, the correlator 150 may modify the filters 117 and 127. For example, the correlator 150 may add additional anomalies that need to be detected to the filters 117 or may modify the prescribed noise level in the filters 127. Also, the correlator 150 may modify the filters 117 and 127 to proactively enable or disable detection of anomalies for specific client devices based on various parameters, such as whether the client device is engaged in a voice call via a cellular network, whether the client device is mobile or stationary, etc. Additionally, the correlator 150 may instruct the RF interference detector 126 and/or the anomaly detector 116 to cause packet captures and stream captures, respectively, to be maintained in storage until the correlator 150 requests reporting of the packet capture and stream captures.

The correlator 150 may also configure the sensitivity in reporting various anomalies depending on how serious the anomalies are by modifying the filters 117 and 127. For example, the correlator 150 may instruct the RF interference detector 126 to report spectrum captures of excessive radio frequency interference to be immediately reported and/or instruct the anomaly detector 116 to immediately report annotated packet captures for specific anomalies in connectivity that represent a serious threat to network communications with client devices.

The access point 110 may be implemented in one or more computing devices, such as the computing device 300 shown in FIG. 3 and described below. Similarly, the correlator 150 may be implemented in one or more computing devices, such as the computing device 300 shown in FIG. 3 and described below.

Figure 2A:
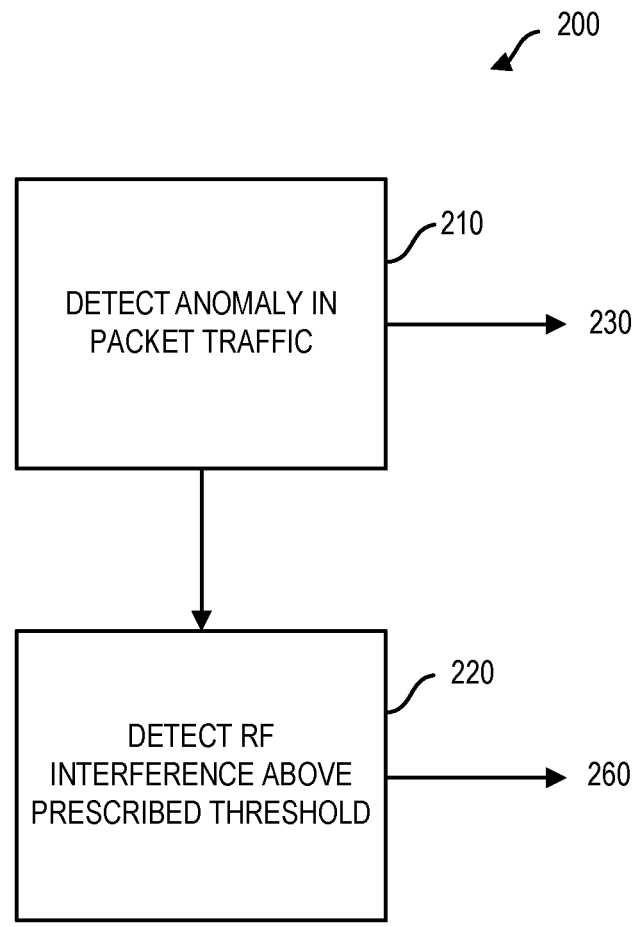
FIGS. 2A-2C are flowcharts depicting a method for detecting an anomaly, according to one or more examples of the disclosure.
Figure 2B:
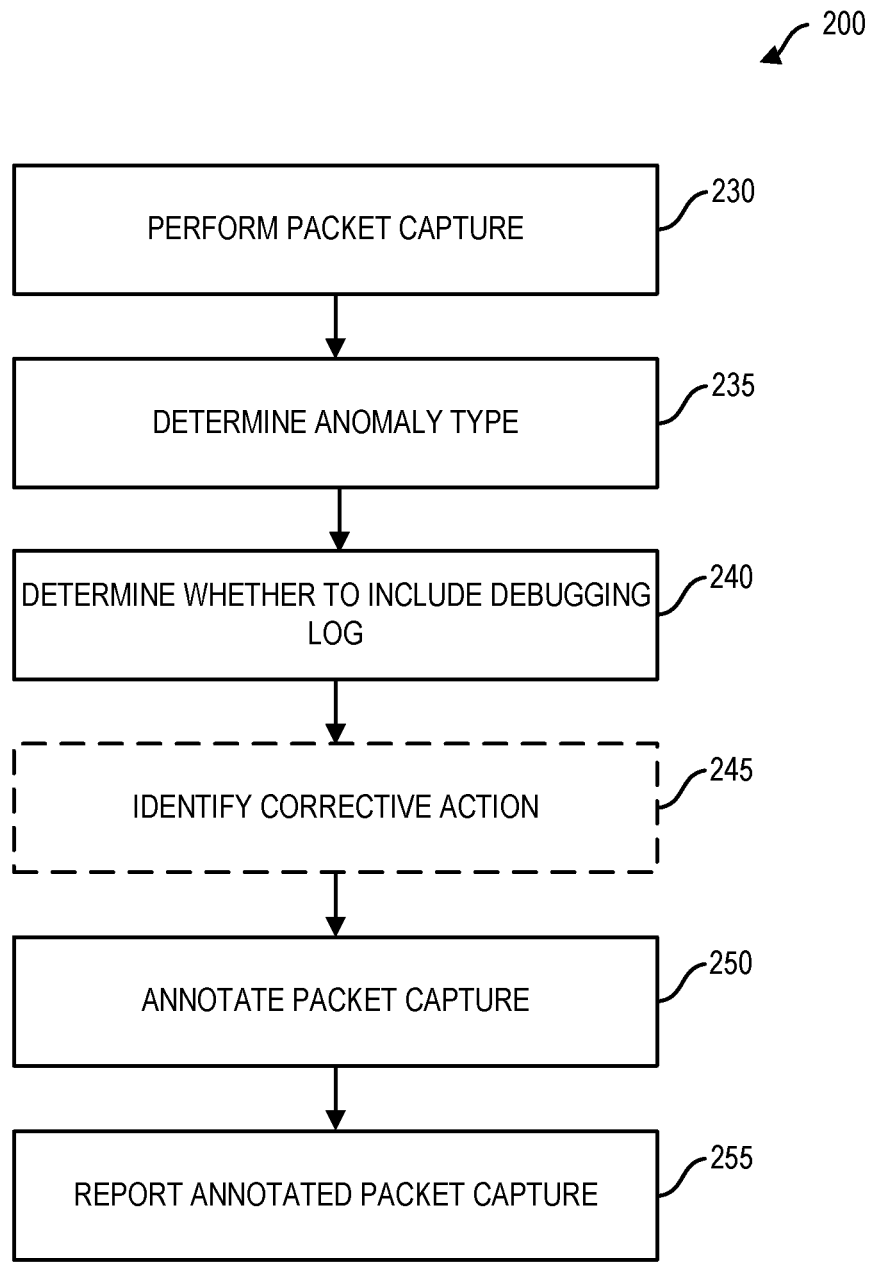
Figure 2C:
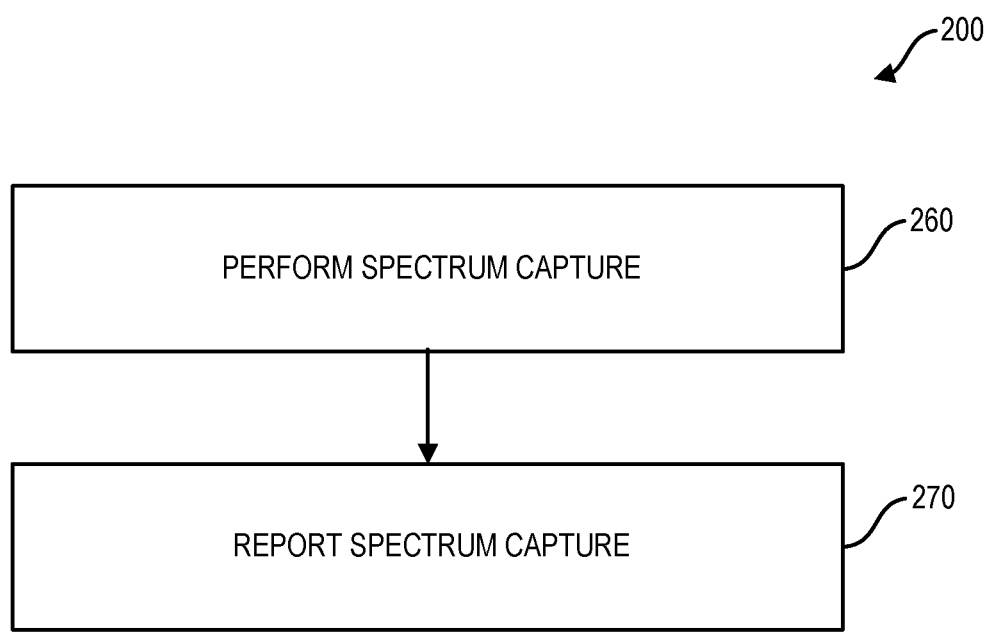

FIGS. 2A-2C are flowcharts depicting a method 200 for detecting an anomaly in connectivity by an access point according to one or more examples of the disclosure. The anomaly in connectivity may be detected by, for example, the access point 110 shown in in connection with the client device 105 and the correlator 150 shown in FIG. 1. As shown in FIG. 2A, the method 200 includes detecting, by the access point at 210, an anomaly in packet traffic. Responsive to detecting the anomaly in packet traffic, the method 200 proceeds to 230 as shown in FIG. 2B and described in further detail below. The method 200 also includes detecting at 220 radio frequency interference that exceeds a prescribed threshold. Responsive to detecting radio frequency interference above a prescribed threshold at 220, the method 200 proceeds to the access point performing a spectrum capture at 260 as shown in FIG. 2C and described in further detail below. Although shown consecutively, it should be appreciated that the detection of an anomaly in packet traffic and detection of radio frequency interference may be performed at the same time. Further, detection of radio frequency interference may be performed even in the absence of packet traffic.

Referring to FIG. 2B, responsive to detecting an anomaly in packet traffic at 210, the method 200 proceeds to performing a packet capture of packets being transmitted to or received from the client device at 230. The access point determines an anomaly type representing a root cause of the anomaly at 235. The access point determines whether to include a debugging log with the packet capture at 240. Optionally, the access point identifies a corrective action at 245. The packet capture is annotated with the anomaly type and, optionally, the corrective action at 250. Additionally, a debugging log (if any) may be attached to the packet capture as part of annotating. The annotated packet capture is reported at 255, either automatically or upon request from the correlator.

Referring to FIG. 2C, responsive to detecting radio frequency interference above a prescribed threshold at 220, the method 200 proceeds to the access point performing a spectrum capture at 260. The spectrum capture is reported at 270, either automatically or upon request from the correlator.

Figure 3:
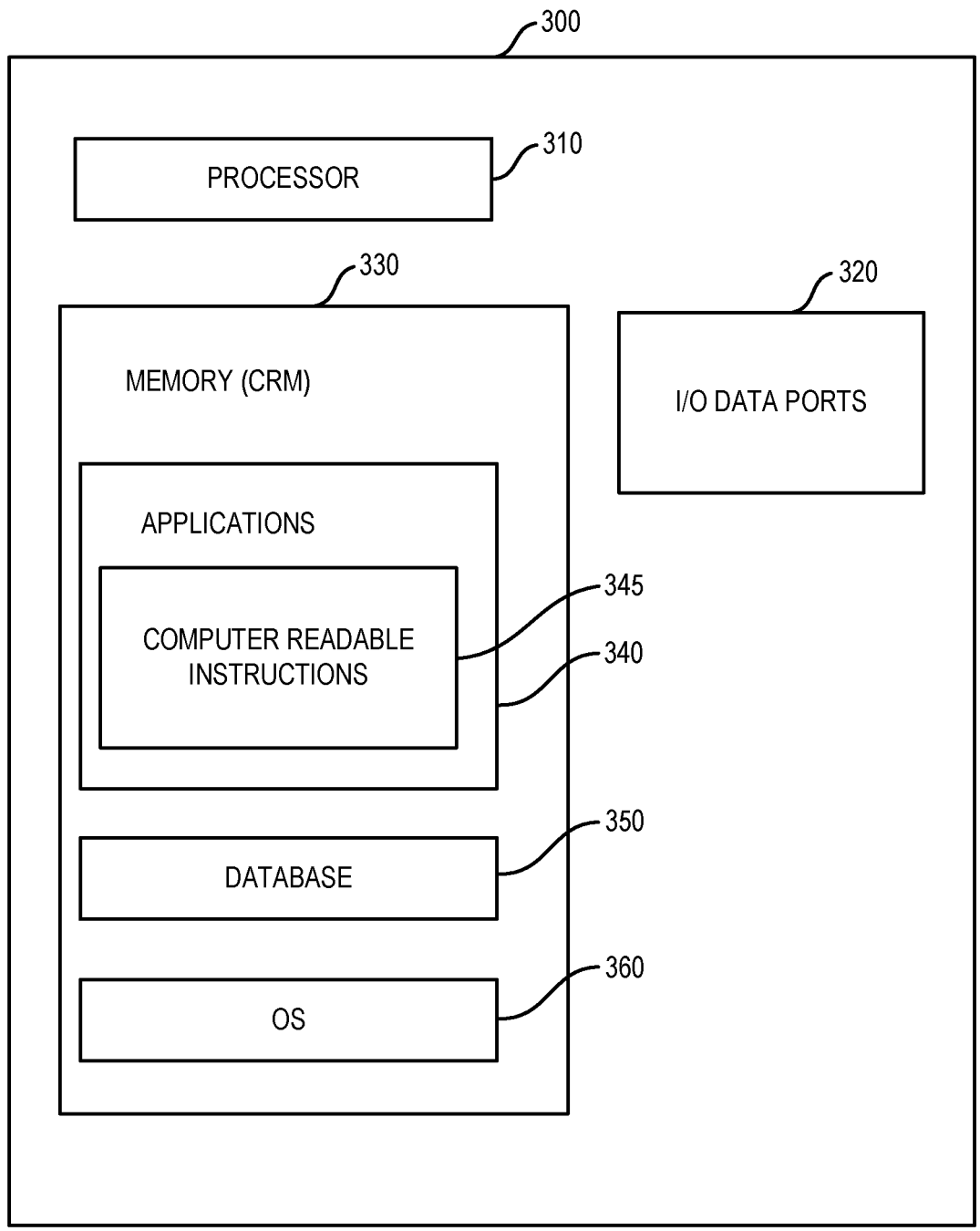
FIG. 3 conceptually illustrates details of a computing device with which the access point shown in FIG. 1 may be implemented, according to one or more examples of the disclosure.

FIG. 3 is a block diagram of a computing device 300 with which the access point 110 and/or the correlator 150 may be implemented, according to illustrative examples. Although no connections are shown between the components illustrated in FIG. 3, those skilled in the art will appreciate that the components can interact with each other via any suitable connections to carry out device functions.

The term "application", or variants thereof, is used expansively herein to include routines, program modules, program, components, data structures, algorithms, and the like. Applications can be implemented on various system configurations, including single-processor or multiprocessor systems, minicomputers, mainframe computers, personal computers, microprocessor-based, programmable consumer electronics, combinations thereof, and the like. The terminology "computer-readable medium" and variants thereof, as used in the specification and claims, includes non-transitory storage media. Storage media can include volatile and/or non-volatile, removable and/or non-removable media, such as, for example, RAM, ROM, EEPROM, flash memory or other memory technology, CDROM, DVD, or other optical disk storage, magnetic tape, magnetic disk storage, or other magnetic storage devices or any other medium that can be used to store information that can be accessed.

Referring to FIG. 3, the computing device 300 includes a processor 310 that receives inputs and transmits outputs via I/O data ports 320. The I/O data ports 320 can be implemented with, e.g., any suitable interface through which data and signals may be received and transmitted wired and/or wirelessly. For example, for the access point 110 shown in FIG. 1, the I/O data ports 320 may include the transceiver 112 and the wired input/output interface 125.

Although not shown, the computing device 300 may also include a physical hard drive. The processor 310 communicates with memory 330 and the hard drive via, e.g., an address/data bus (not shown). The processor 310 can be any commercially available or custom microprocessor. The memory 330 is representative of the overall hierarchy of memory devices containing the software and data used to implement the functionality of the computing device 300. The memory 330 can include, but is not limited to, the types of memory devices described above, including a non-transitory computer readable medium (CRM). As shown in FIG. 3, the memory 330 may include several categories of software and data used in the computing device 300, including applications 340, one or more databases 350, an operating system (OS) 360, etc.

The applications 340 can be stored in the memory 330 and/or in a firmware (not shown) and can include computer readable instructions 345 that can be executed by the processor 310. The applications 340 include various programs that implement the various features of the device 300. For example, for the access point 110, the applications 340 may include applications to implement functions such as detecting anomalies in packet traffic, performing packet captures, identifying anomaly types, identifying corrective actions, determining whether to include debugging logs, annotating the packet captures, detecting radio frequency interface, performing spectrum captures, and reporting the packet captures and spectrum captures, etc. For the correlator 150, the applications 340 may include applications to implement functions such as correlating packet captures, correlating spectrum captures, initiating corrective actions, modifying filters, etc.

The database 350 represents the static and dynamic data used by the applications 340, the OS 360, and other software programs that may reside in the memory. The database 350 may be used to store various data including data needed to execute the applications 340, e.g., filters indicating what anomalies in packet traffic to detect and a prescribed noise threshold, data indicating whether to report packet captures and/or spectrum captures automatically or upon request, anomaly types and associated root causes, etc. The database may also include the packet capture storage 114 and the spectrum capture storage 128 shown in FIG. 1.

While the memory 330 is illustrated as residing proximate the processor 310, it should be understood that at least a portion of the memory 330 can be a remotely accessed storage system, for example, a server on a communication network, a remote hard disk drive, a removable storage medium, combinations thereof, and the like.

It should be understood that FIG. 3 and description above are intended to provide a brief, general description of a suitable environment in which the various aspects of some examples of the present disclosure can be implemented. While the description includes a general context of computer-executable instructions, the present disclosure can also be implemented in combination with other program modules and/or as a combination of hardware and software in addition to, or instead of, computer readable instructions. For example, the access point 110 could be implemented in whole or in part on specialized hardware in order to achieve faster computation times.

The foregoing description, for purposes of explanation, used specific nomenclature to provide a thorough understanding of the disclosure. However, it will be apparent to one skilled in the art that the specific details are not required in order to practice the systems and methods described herein. The foregoing descriptions of specific examples are presented for purposes of illustration and description. They are not intended to be exhaustive of or to limit this disclosure to the precise forms described. Obviously, many modifications and variations are possible in view of the above teachings. The examples are shown and described in order to best explain the principles of this disclosure and practical applications, to thereby enable others skilled in the art to best utilize this disclosure and various examples with various modifications as are suited to the particular use contemplated. It is intended that the scope of this disclosure be defined by the claims and their equivalents below.

What is claimed is:

1. A method comprising:
    detecting, by an access point providing a client device with access to a communication network, an anomaly in packet traffic, wherein the access point is configured to detect anomalies in packet traffic and anomalies in connectivity due to radio frequency interference;
    upon detecting the anomaly in the packet traffic, triggering, by the access point, a packet capture process of packets being transmitted to or received from the client device, wherein triggering the packet capture process releases the packets stored in a buffer at the access point responsive to detecting the anomaly;
    determining, by the access point, an anomaly type representing a root cause of the anomaly in the packets released from the buffer at the access point;
    annotating, by the access point, the packets with the anomaly type;
    detecting a radio frequency interference associated with the anomalies in connectivity, wherein the radio frequency interference exceeds a prescribed threshold; and
    responsive to detecting that the radio frequency interference exceeds the prescribed threshold, performing a spectrum capture process in addition to the packet capture process.

2. The method of claim 1, further comprising reporting at least one of the anomaly in packet traffic and the anomaly in connectivity automatically or upon request.

3. The method of claim 1, further comprising identifying a corrective action.

4. The method of claim 3, further comprising annotating the packets with an identifier of the corrective action.

5. The method of claim 4, further comprising initiating the corrective action.

6. The method of claim 1, further comprising determining whether to collect a debugging log based on the anomaly type.

7. The method of claim 1, wherein the spectrum capture process uses a Fast Fourier Transform snapshot of an interfering signal.

8. The method of claim 1, wherein the spectrum capture process continually stores snapshots in a ring buffer in a spectrum capture storage.

9. The method of claim 8, wherein performing the spectrum capture process releases the snapshots stored in the ring buffer.

10. The method of claim 8, further comprising: receiving reports from the packet capture process and the spectrum capture process in a continuous stream.

11. An access point providing a client device with access to a communication network, comprising:
    a buffer to store packets;
    a wireless radio transceiver to transmit or receive the packets to or from a client device;
    an anomaly detector to:
        detect an anomaly in packet traffic being transmitted to or received from the client device, wherein the access point is configured to detect anomalies in the packet traffic and anomalies in connectivity due to radio frequency interference; and
        upon detecting the anomaly in the packet traffic, triggering a packet capture process of the packets being transmitted to or received from the client device responsive to detecting the anomaly, wherein triggering the packet capture process releases the packets stored in the buffer;
    a radio frequency interference detector to:
        detecting a radio frequency interference associated with the anomalies in connectivity, wherein the radio frequency interference exceeds a prescribed threshold; and
        responsive to detecting that the radio frequency interference exceeds the prescribed threshold, performing a spectrum capture in addition to the packet capture process;
    an anomaly type identifier to determine an anomaly type representing a root cause of the anomaly in the packets released from the buffer; and
    an annotator to annotate the packets with the anomaly type.

12. The access point of claim 11, further comprising a wired interface to report the packet capture annotated with the anomaly type.

13. The access point of claim 11, further comprising a corrective action identifier to identify a corrective action for the anomaly based on the anomaly type.

14. The access point of claim 13, wherein the annotator is to annotate the packets with an identity of the corrective action identified by the corrective action identifier.

15. The access point of claim 11, wherein the buffer is a ring buffer, and wherein the anomaly detector triggers release of the packets from the ring buffer responsive to detecting the anomaly.

16. A non-transitory computer readable medium comprising computer executable instructions stored thereon that, when executed by a processor in an access point of a communication network, cause the processor to:
 detect an anomaly in packets being transmitted to or received from a client device by the access point, wherein the access point is configured to detect anomalies in packet traffic and anomalies in connectivity due to radio frequency interference;
 upon detecting the anomaly in the packet traffic, triggering a packet capture process of the packets being transmitted to or received from the client device by the access point, wherein triggering the packet capture process releases the packets stored in a buffer at the access point responsive to detecting the anomaly;
 determine an anomaly type representing a root cause of the anomaly in the packets released from the buffer at the access point;
 annotate the packets with the anomaly type;
 report the packets annotated with the anomaly type;
 detect a radio frequency interference associated with the anomalies in connectivity, wherein the radio frequency interference exceeds a prescribed threshold; and
 responsive to detecting that the radio frequency interference exceeds the prescribed threshold, perform a spectrum capture in addition to the packet capture process.

17. The non-transitory computer readable medium of claim 16, further comprising instructions stored thereon that, when executed by the processor, cause the processor to identify a corrective action based on the anomaly type.

18. The non-transitory computer readable medium of claim 17, further comprising instructions stored thereon that, when executed by the processor, cause the processor to annotate the packets with an identity of the corrective action.

19. The non-transitory computer readable medium of claim 17, further comprising instructions stored thereon that, when executed by the processor, cause the processor to initiate the corrective action.

* * * * *